United States Patent [19]

Colin

[11] Patent Number: 5,253,389

[45] Date of Patent: Oct. 19, 1993

[54] FOLDABLE CASTER

[75] Inventor: George M. Colin, South Laguna, Calif.

[73] Assignee: Odyssey Systems, Ltd., San Clemente, Calif.

[21] Appl. No.: 949,027

[22] Filed: Sep. 21, 1992

[51] Int. Cl.⁵ .................. B60B 33/00; B60B 33/06
[52] U.S. Cl. .................................. 16/30; 16/34; 16/DIG. 14
[58] Field of Search .......... 16/30, 19, 34, 29, DIG. 14

[56] References Cited

U.S. PATENT DOCUMENTS

| | | |
|---|---|---|
| 234,496 | 11/1880 | Simmons . |
| 889,298 | 6/1908 | Davis ........................................ 16/34 |
| 1,058,837 | 4/1913 | Zikmund . |
| 2,309,214 | 1/1943 | Rey . |
| 2,359,016 | 9/1944 | Wood . |
| 2,707,877 | 5/1955 | Cline . |
| 2,800,679 | 7/1957 | Schultz . |
| 2,814,498 | 11/1957 | Hull . |
| 3,935,613 | 2/1976 | Kaneko ....................................... 16/30 |
| 4,254,850 | 3/1981 | Knowles . |
| 4,845,804 | 7/1989 | Garrett . |

FOREIGN PATENT DOCUMENTS 1277373 10/1961 France ........................... 16/DIG. 14

Primary Examiner—John Sipos
Assistant Examiner—Carmine Cuda
Attorney, Agent, or Firm—W. Norman Roth

[57] ABSTRACT

A foldable caster, particularly suited for use with a swimming pool reel support, is foldable approximately 270° between an operative position and a stowed position and is magnetically or otherwise secured in at least the storage position.

15 Claims, 2 Drawing Sheets

FOLDABLE CASTER

BACKGROUND OF THE INVENTION AND PRIOR ART

Casters are used in many industries where it is often necessary to be able to easily move a relatively heavy unit. The present invention was developed in connection with the swimming pool industry which uses removable swimming pool covers which can be reeled onto a spool which is supported at each of its ends on opposite sides of a swimming pool where it is necessary to move the rolled swimming pool cover unit to and away from a pool. When the cover is being rolled or unrolled from the spool the swimming pool cover support structure should not be mounted on casters but instead should be supported directly on the pool deck or other firm support platform in the area. In order to be commercially viable, the caster must be easy foldable from its operative position at least 180° and preferably about 270° to storage and it must be inexpensive to manufacture.

SUMMARY OF THE INVENTION

The present invention accordingly provides a foldable caster comprising:

a) a caster base plate;

b) a caster support plate, said support plate being connected to said base plate by a hinge having a first axis;

c) a caster swivel affixed to said caster support plate for rotary movement relative thereto about a second axis perpendicular to said first axis, said swivel having means for rotatably supporting a caster wheel thereon;

d) a caster wheel rotatably mounted on said swivel for rotation about a third axis which is perpendicular to said second axis;

e) means for securing said caster support plate to said base plate on a first side of said base plate with said caster wheel in operative position; and f) means for securing said swivel to the opposite side of said base plate with said caster wheel in a storage position.

The present invention further provides a foldable caster and caster housing comprising:

a) a caster housing;

b) a caster base plate slidably received in a pair of opposed grooves in said housing;

c) a caster support plate, said support plate being hingedly connected along a first axis to said base plate for movement of at least 180° around said first axis, said first axis being perpendicular to the direction of movement of said base plate into said housing grooves;

d) a caster swivel affixed to said caster support plate for rotary movement relative thereto about a second axis perpendicular to said first axis, said swivel having means for rotatably supporting a caster wheel thereon;

e) a caster wheel rotatably mounted on said swivel for rotation about a third axis which is substantially perpendicular to said second axis;

f) means for securing said caster support plate to said base plate on a first side of said base plate with said caster wheel operatively positioned outside of said housing; and g) means for securing said swivel and caster wheel for storage in said housing with said swivel on the side of said base plate opposite said first side of said base plate.

DESCRIPTION OF THE PREFERRED EMBODIMENT

Figure 1:
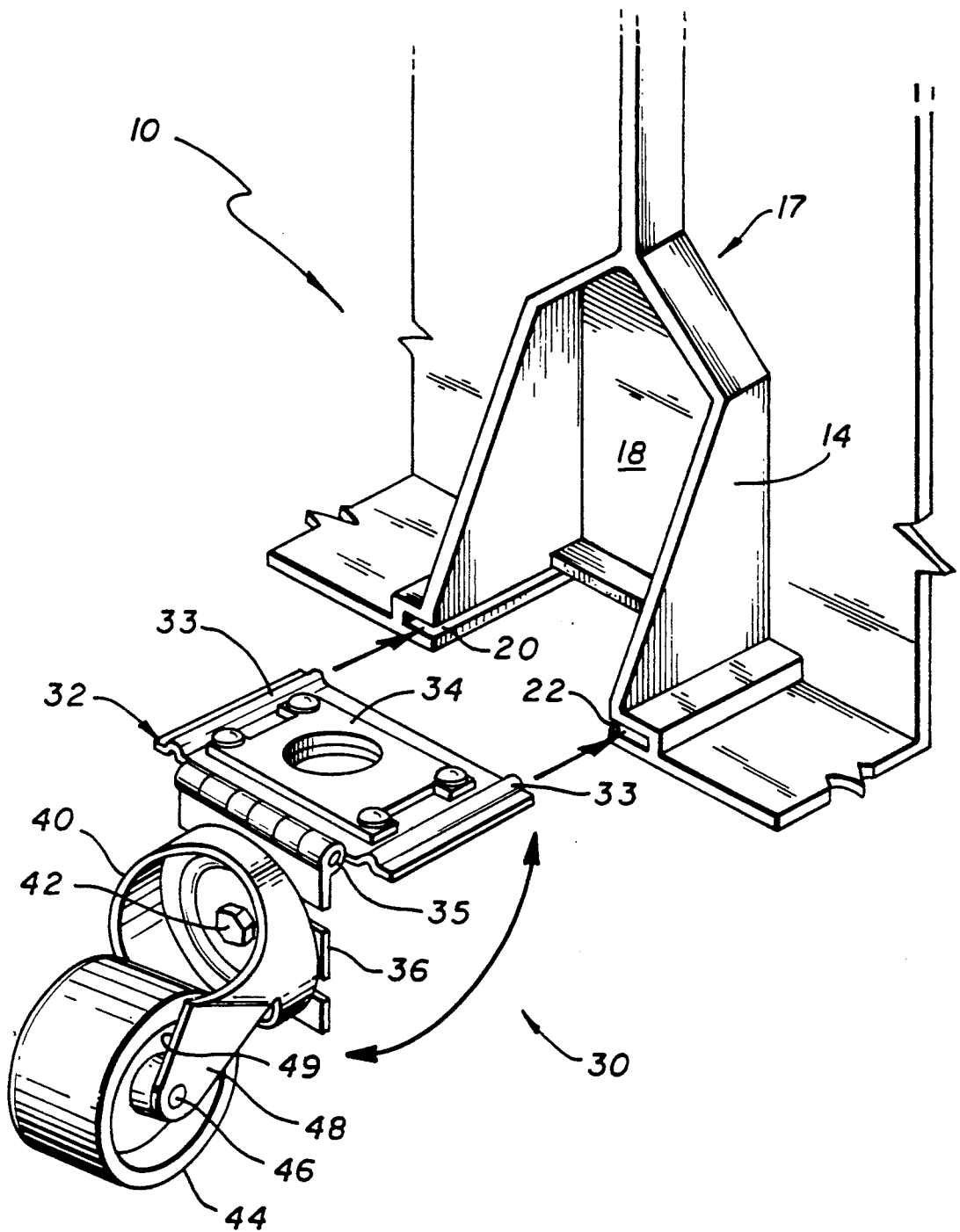
FIG. 1 is an exploded perspective view of a foldable caster disposed in an intermediate position between an operative position and a folded storage position in a caster housing and support structure.

FIG. 1 shows a housing structure in the form of one leg 10 of a swimming pool cover support which is typically made of molded plastic. The support structure is seen to have a peripheral housing wall 14 and a back wall 18 which together provide a storage housing 19 for the foldable caster 30 to be described below. The plastic housing 19 has a pair of opposed slots 20,22 which slidably receive a caster base plate 32 which is made of magnetic material or metal having a magnetic insert 34 therein. The caster base plate 32 is connected by a horizontally extending hinge 35 to a caster support plate 36 whereby the caster support plate 36 is free to move relative to the base plate 32 about the axis of the hinge 34.

A caster swivel 40 comprised of a generally circular piece of cut sheet metal is attached to the caster support plate 36 by a fastener 42 which permits rotary movement of the caster swivel 40 relative to the caster support plate 36 about the axis of the fastener. As shown, the axis of the fastener 42 is at all times perpendicular to the axis of the hinge 35.

The caster wheel 44 is supported for rotation on an axle 46 or in bearings on a pair of flanges 48 extending from the circular portion of the caster swivel 40.

The base plate 32 is preferably provided with crimps 33 on its opposite lateral edges whereby the base plate 32 is tightly received in the slots 20, 22 in the housing 19 and is retained therein by a snug friction fit.

Figure 2:
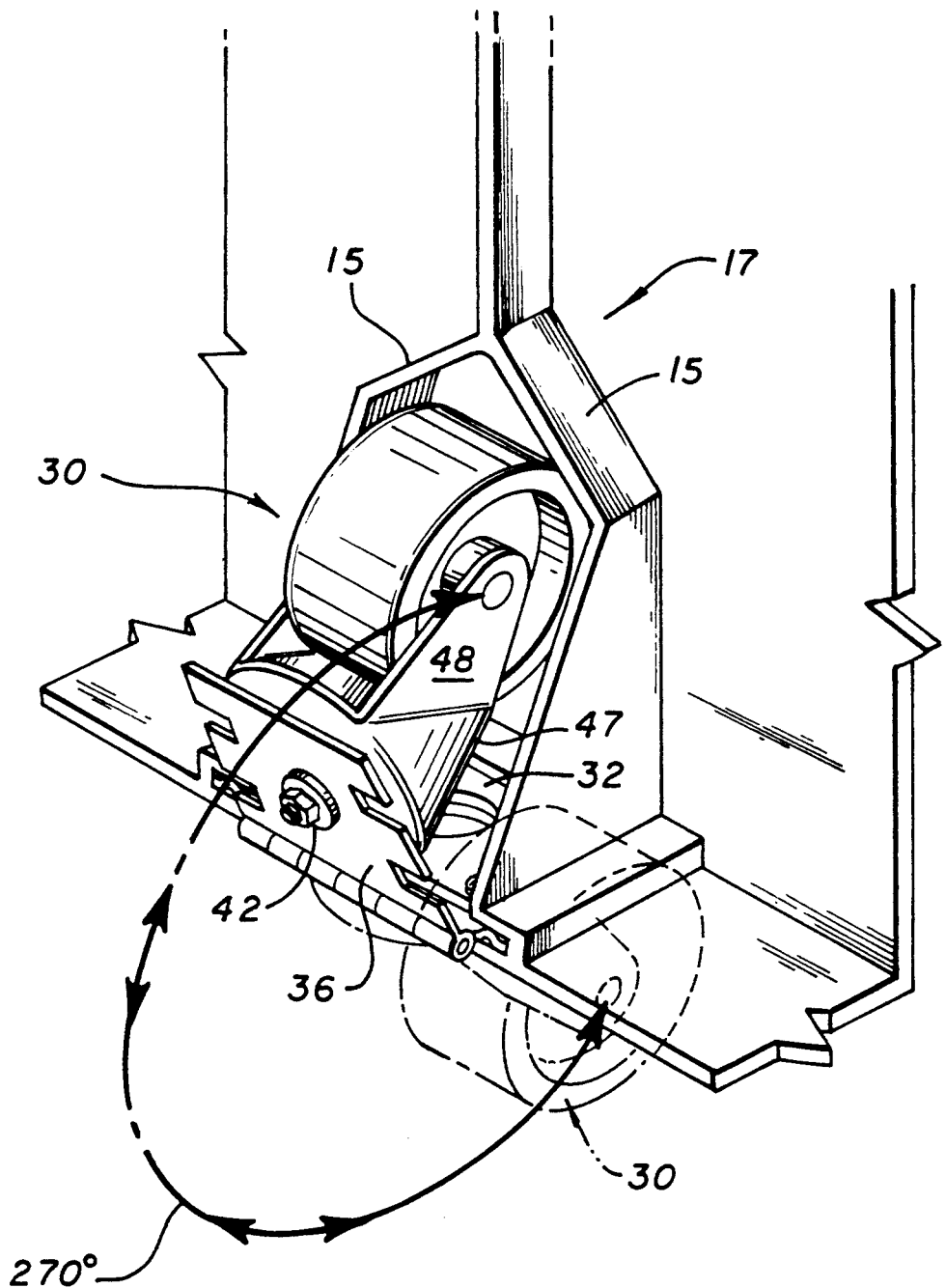
FIG. 2 is a perspective view of the foldable caster of FIG. 1 disposed in a folded or storage position and showing, in phantom, the position of the caster in its operative supporting position.

As best seen in FIG. 2, the caster 30 is moveable at least 180° and approximately 270° from a stowed inoperative position in the housing 19 shown in solid lines to an operative wheel supporting position shown in phantom and is secured in at least one of these positions by magnetic contact of the base plate 32 and either the caster support plate 36 or the edge portions 49 of the flanges 48 of the caster swivel 40. Preferably, the caster support plate 36 is made of metal so that the caster in its operative position is secured magnetically by contact between the abutting surfaces of the magnetic base plate 32 and the caster support plate 36. The support plate 36 need not be made of metal if magnetic securement in the operative or supporting position is not desired. In the stowed position of the caster, the side edges 49 of the metal flanges 48 of the caster swivel contact the upper side of the magnetic caster support plate 36 to hold the caster 30 in the storage position in the housing 19.

Although the caster base plate, support plate and swivel are all preferably made of magnetically attractive metal, this is not essential since the caster can be secured in its stowed position in the housing simply by an interference fit between the caster and the slightly flexible angled portions 15 of the peripheral wall 14 of the housing whereas in the operative position it is secured merely by the weight of the structure it supports instead of by magnetic contact between a magnetic base plate 32 and magnetically attractive metal caster support plate 36.

Persons skilled in the art will readily appreciate that various modifications can be made from the preferred embodiment thus the scope of protection is intended to be defined only by the limitations of the appended claims.

I claim:
1. A foldable caster comprising:
   a) a caster base plate;
   b) a caster support plate, said support plate being connected to said base plate by a hinge having a first axis;
   c) a caster swivel affixed to said caster support plate for rotary movement relative thereto about a second axis perpendicular to said first axis, said swivel having means for rotatably supporting a caster wheel thereon;
   d) a caster wheel rotatably mounted on said swivel for rotation about a third axis which is perpendicular to said second axis;
   e) means for securing said caster support plate to said base plate on a first side of said base plate with said caster wheel in operative position; and
   f) means for securing said swivel to the opposite side of said base plate with said caster wheel in a storage position, said caster being movable in excess of 180° about the axis of said hinge.

2. A foldable caster according to claim 1, wherein said caster is moveable about 270° about the axis of said hinge.

3. A foldable caster according to claim 1, wherein said means for securing said caster support in at least one of said positions are magnetic.

4. A foldable caster according to claim 3, wherein said base plate is magnetic and said caster support plate is magnetically attractive metal.

5. A foldable caster according to claim 4, wherein said base plate and said caster support plate are substantially flat.

6. A foldable caster according to claim 3, wherein said base plate is magnetic and said swivel has magnetically attractive metal portions which contact said magnetic base plate to magnetically secure said caster in said storage position.

7. A foldable caster according to claim 6, wherein said magnetically attractive portions comprise a pair of flanges which together support said caster wheel bearing.

8. A foldable caster and caster housing comprising:
   a) a caster housing;
   b) a caster base plate slidably received in a pair of opposed grooves in said housing;
   c) a caster support plate, said support plate being hingedly connected along a first axis to said base plate for movement of at least 180° around said first axis, said first axis being perpendicular to the direction of movement of said base plate into said housing grooves;
   d) a caster swivel affixed to said caster support plate for rotary movement relative thereto about a second axis perpendicular to said first axis, said swivel having means for rotatably supporting a caster wheel thereon;
   e) a caster wheel rotatably mounted on said swivel for rotation about a third axis which is substantially perpendicular to said second axis;
   f) means for securing said caster support plate to said base plate on a first side of said base plate with said caster wheel operatively positioned outside of said housing; and
   g) means for securing said swivel and caster wheel for storage in said housing with said swivel on the side of said base plate opposite said first side of said base plate.

9. A foldable caster and caster housing according to claim 8, wherein said support plate is moveable approximately 270° around said first axis.

10. A foldable caster and caster housing according to claim 9, wherein said means for securing said caster support plate in at least one of said positions are magnetic.

11. A foldable caster and caster housing according to claim 8, wherein said base plate is magnetic and said caster support plate is magnetically attractive metal.

12. A foldable caster and caster housing according to claim 11, wherein said base plate and said caster support plate are substantially flat.

13. A foldable caster and caster housing according to claim 10, wherein said base plate is magnetic and said swivel has magnetically attractive metal portions which contact said magnetic base plate to magnetically secure said caster in said storage position.

14. A foldable caster and caster housing according to claim 13, wherein said magnetically attractive portions comprise a pair of flanges which together support said caster wheel.

15. A foldable caster and caster housing according to claim 8, wherein said caster is secured for storage in said housing by friction contact between said caster swivel and wall portions of said housing.

* * * * *